United States Patent

Mullen

[15] 3,690,150
[45] Sept. 12, 1972

[54] PIPE LINE LEAK DETECTION AND LOCATION SYSTEM

[72] Inventor: John S. Mullen, Florham Park, N.J. 07932

[73] Esso Research and Engineering Company
[22] Filed: Aug. 19, 1971
[21] Appl. No.: 173,113

[52] U.S. Cl. ............................................73/40.5 R
[51] Int. Cl. ..........................G01m 3/02, G01m 3/28
[58] Field of Search...............73/40, 40.5 R; 340/242

[56] References Cited

UNITED STATES PATENTS 3,610,025  10/1971  Brunner..................73/40.5 R

*Primary Examiner*—Louis R. Prince
*Assistant Examiner*—William A. Henry, II
*Attorney*—Leon Chasan et al.

[57] ABSTRACT

A pipe line leak detection and location system including means for raising and lowering the pressure in a flowing pipe line, and metering the flow at the inlet and outlet of the pipe line at the different pressure levels, thus enabling pipe line leaks of very small magnitude to be detected. By determining the increase in the rate of a leak at high pressure over that obtained at low pressure, pipe line leaks can be detected. Block valves paralleled by orifices, or control valves, located at spaced intervals along the pipe line permit the raising and lowering of the pressure in selected segments of the pipe line, and allow the particular location of the leak also to be determined. When a leak is present the difference between the inflow and outflow readings will be greater at the higher pressure than at the lower pressure and when there is no leak present, the difference between these readings will be the same at the high pressure and the low pressure. Electronic control means are provided to receive pressure and flow responsive signals from the pipe line and transmit these signals to further control equipment connected with the pipe line for controlling pressure and flow thereof.

7 Claims, 8 Drawing Figures

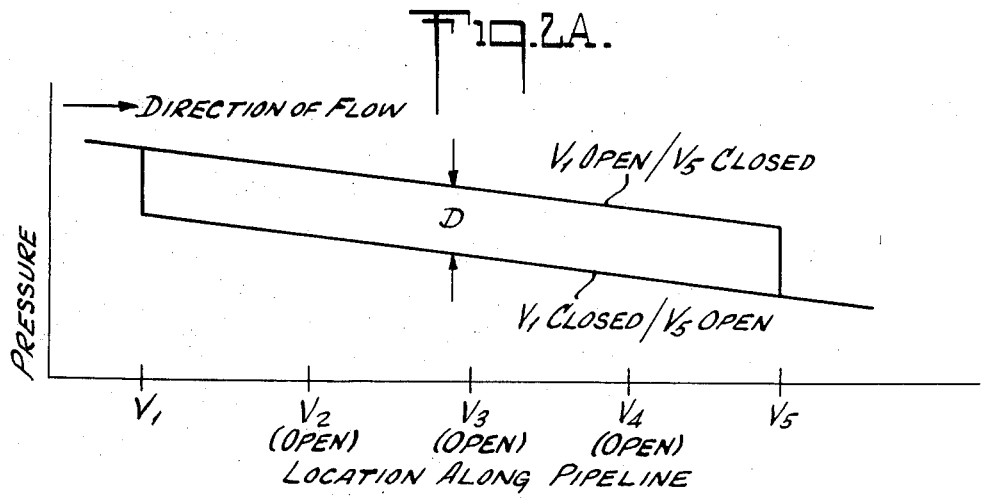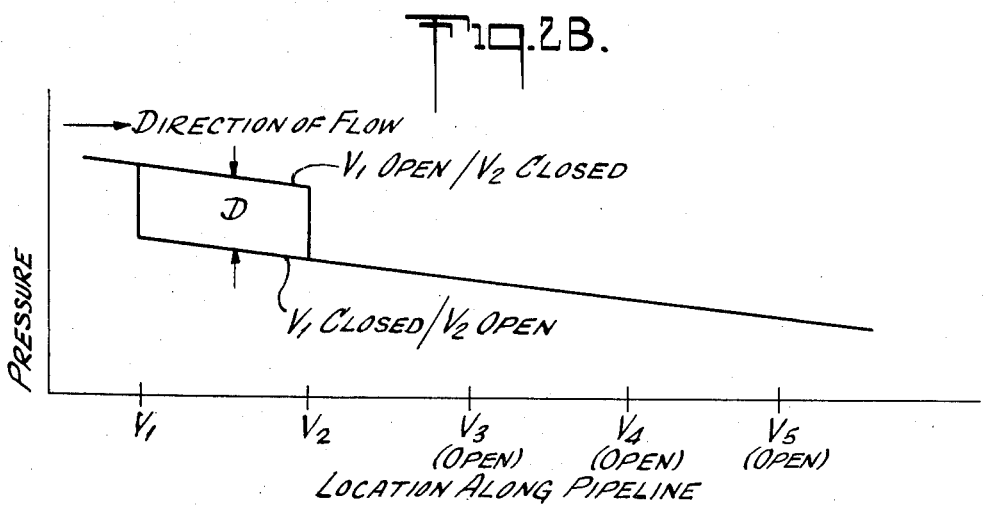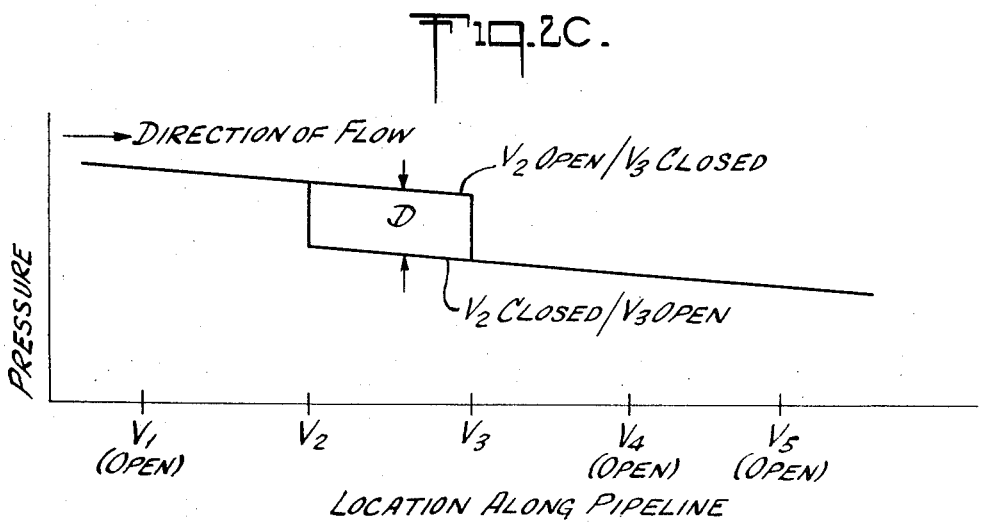

INVENTOR
JOHN S. MULLEN

PIPE LINE LEAK DETECTION AND LOCATION SYSTEM

BACKGROUND OF THE INVENTION

The present invention relates to a system for determining the presence and location of a leak in a pipe line. More particularly, the present invention relates to a system for detecting leaks in a pipe line by means of varying pipe line pressure, which permits the detection of extremely small leaks and does not give a false indication of a leak when the pipe line operating conditions change significantly. Further, the system determines the location of the leak and validates that a leak alarm is truly a leak rather than equipment malfunction.

The need for a system that satisfactorily will detect leaks in a pipe line as well as determine the location of the leak, is self-evident in view of the deep concern for pollution and ecology. Such a system finds particular utility where oil and/or gas is transmitted in volume such as through overland pipe lines or offshore pipe line operations. The employment of such a system clearly is desirable not only for reducing product loss but, also, to avoid any significant associated environmental damage from pipe line leakage. Prior pipe line leak detection systems rely essentially in precise metering of the material entering and leaving the pipe line. A leak is detected when the material balance shows a greater amount of material entering than leaving the pipe line. Prior art systems which have been proposed and currently are commercially available use the foregoing type of inlet-outlet material balance system or a refinement thereof commonly referred to as a "differential flow totalizing system." Typical of the latter are systems which reduce meter error by relying on the reproducibility rather than the absolute accuracy of meter readings. However, while such a system improves accuracy, it seriously downgrades the ability of the system to detect leaks. Such a system can only detect a leak if it starts while the product is being pumped through the pipe line. However, such a system will be incapable of detecting a leak if the leak existed prior to the beginning of flow through the line. The prior art systems heretofore available all have a common weakness in that if the equipment is set to provide an alarm for very small leaks, consequently it will give false alarms due to dynamic changes in pipe line system conditions such as temperature, pressure, viscosities, pumping rates, and the like. To avoid this, the prior art systems must be calibrated to provide an alarm for large leaks only. A typical prior art system which relies on metering the difference between inflow and outflow can essentially be described as follows:

$\Delta$ Meter Reading = Leak $\pm$ Meter Error $\pm$ Line Inventory Volume Change $\Delta$ Meter Reading = Leak $\pm$ 0.5 percent $\pm$ (0 to Several percent)

Thus, a true leak can be covered up (i.e., show up as zero $\Delta$ Meter Reading) by positive meter error or a line inventory expansion. Conversely, a false leak can be indicated due to a negative error or a line inventory contraction. While improved leak detection systems reduce the meter error by relying on repeatability rather than absolute accuracy, this means that the meters will not balance at the start and therefore cannot determine if a leak exists when the system is started up. This can be shown as:

$\Delta$ Meter Reading = Leak $\pm$ Meter Error $\pm$ Inv. Vol. Change $\pm$ Offset $\Delta$ Meter Reading = Leak $\pm$ 0.03 percent $\pm$ (0 to several percent) $\pm$ Offset The problem of failing to detect a leak, or conversely, providing a false alarm, still exists. Although the meter error has been reduced, the inventory change effects are large and will cover up real leaks and create false leaks.

A system constructed according to the present invention permits the detection of smaller leaks than other known prior art systems and will not provide a false leak alarm. In the present system the effects of changing pipe line conditions, such as temperature, pressure and viscosity, do not affect the system's ability to detect leaks. These changes are cancelled out by employing a novel technique which effectively compares discrete sets of meter readings, one at high pipe line pressure and one at low pressure. By taking these readings in relatively close sequence, there is obtained two separate but close transitional pictures of the overall system which precludes long term dynamic trends, such as thermal expansion and the like. These trends are avoided and only the effects of pressure on the leak are seen.

In addition to the foregoing shortcomings, prior art systems are unable to locate the particular section of the pipe line containing the leak. When a leak is detected, it is then necessary to physically conduct an extensive ground and air search to determine the exact location of the leak which consequently results in a rather extensive and costly downtime on the pipe line. The present system avoids extensive searches and long downtimes by determining immediately what segment of the pipe line the leak is in.

Another deficiency of prior art systems is their inability to verify whether a leak alarm is truly a leak rather than faulty detection equipment. Thus, the person(s) in charge of the monitoring equipment must determine, based on past performance of the system, whether they should believe the alarm and shut down the system or disbelieve the alarm and continue the pipe line in operation. If a system previously has given faulty alarms, a certain credibility gap is generated and persons in charge may have a tendency to disbelieve the alarm rather than suffer the severe economic consequences of a shutdown and leak search. Because prior art systems tend to give false alarms when pipe line conditions change, such credibility gaps are not uncommon.

The present system avoids this problem by providing a positive way of testing the leak detection system to determine if it is faulty. The unique feature of raising and lowering the pressure in selective segments of the line permits this type of testing. A true leak will show up on only one segment, whereas a faulty component in the detection system (such as a malfunctioning meter) will affect all segments and indicate a leak on all segments. The latter is positive proof that the detection system is malfunctioning.

There are other prior art leak detection systems which detect changes in pressure drop along the pipe line to indicate that a leak has developed. Such a system relies on the fact that the increased flow resulting from the leak will create a greater pressure drop.

As discussed above, the present system detects difference in flows to determine if a leak has occurred, and further requires that the pressure in the pipe line be raised and lowered in a predetermined fashion to induce the leak to increase and decrease. The meters detect these changes.

Also, generally these other prior art systems which employ pressure sensors at intervals along the pipe line do not use or require inlet and outlet flow meters, whereas the present system employs flow meters at each end of the pipe line to measure flow, and does not use or require pressure sensors spaced at intervals along the pipe line. The present system also requires facilities to raise and lower pressure in the pipe line in a controlled manner.

Accordingly, it is a primary object of the present invention to provide a pipe line leak detection system which operates on the principle of varying pipe line pressure.

Another object of the present invention is to provide a system which is capable of detecting leaks of a very small magnitude in a pipe line and retaining this capability in the presence of changing pipe line conditions of temperature, pressure and viscosity.

A further object of the present invention is to provide a novel and improved pipe line leak detection and location system, which is capable of locating the segment of the pipe line containing the leak and verifying that the leak is truly a leak rather than a fault in the detection system.

Additional objects and advantages of the invention will be set forth in part in the description which follows and part will be obvious from the description or may be learned by practice of the invention. The objects and advantages are realized and obtained by means of the instrumentality particularly pointed out in the appended claims. These objects and advantages will be apparent from the following detailed description of the preferred embodiment of the invention which is exemplary and explanatory but not restrictive of the invention. The accompanying drawings which are incorporated in and constitute a part of this specification illustrate an example of a preferred embodiment of the invention, and together with the description thereof serve to explain the principles of the invention.

BRIEF DESCRIPTION OF THE DRAWINGS

FIGS. 2A 2B, and 2C graphically illustrate in sequence pressure changes in the various line segments to locate the leak shown in FIG. 2.

DESCRIPTION OF THE PREFERRED EMBODIMENTS

Figure 1:
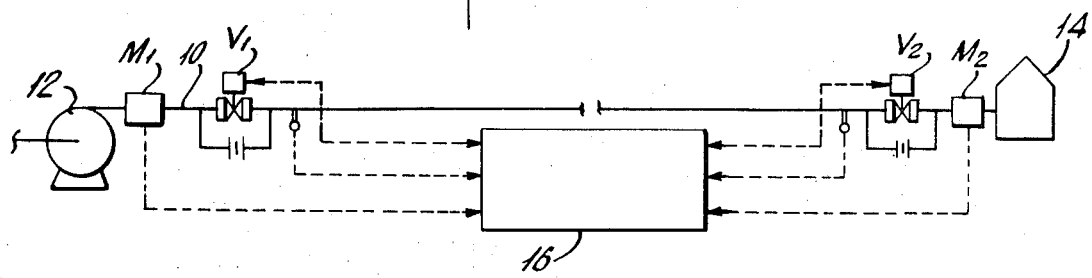
FIG. 1 is a schematic view of a pipe line leak detection system constructed in accordance with the present invention and showing the major components thereof on a typical pipe line installation.

The present leak detection system employs a varying pipe line pressure technique. If a leak exists, it will tend to leak more at the higher pressure than at the lower pressure reading and this will be reflected in the particular meter readings. In order to avoid alarms on very short term transient effects, such as product interface passing through a meter, several readings at each pressure are averaged before a leak alarm is actuated. Alarming when the desired number of readings have been taken is accomplished by means of the computer or electronic hardware used to control the system. If a computer is used then the program will prevent premature alarming and if electronic hardware is employed, then the logic circuits will accomplish this function. A mathematical explanation of how the present system constructed in accordance with the present invention operates is as follows:

The system is based on the previously stated principle that a hole in the pipe wall will leak more at higher pressures than at lower pressures. Meters are used to measure the inflow and outflow, first at a high pressure and then at a slightly lower pressure. The difference between the flow meter readings at the high and low pressure readings is a measure of the increase in the leak due to the pressure change.

(1) $\Delta$ Meter Reading $_{Hi}$ = Leak $_{Hi}$ ± Meter Error ± Inventory Change + Offset (2) $\Delta$ Meter Reading $_{Lo}$ = Leak $_{Lo}$ ± Meter Error ± Inventory Change + Offset Subtracting (2) from (1) gives:

3. $\Delta\Delta$ Meter Reading = $\Delta$ Leak ± $\Sigma$ Errors ± $\Delta$ Inventory Change

+ 0

Because these high and low readings are taken only a few minutes apart, the $\Delta$ Inventory change is negligible (less than 0.01 percent) and can be disregarded. Therefore:

4. $\Delta\Delta$ Meter Reading = $\Delta$ Leak ± Errors
5.   = $\Delta$ Leak ± 0.04 percent (typical error)

By taking a number of readings and averaging them, the accuracy can be improved to:

6. $\Delta\Delta$ Meter Reading = $\Delta$ Leak ± 0.01 percent.

Equation (6) above shows that the present system's ability to detect leaks is unaffected by changing pipe line conditions. The $\Delta\Delta$ Meter Readings are only sensitive to leaks. They do not register changes due to changing pipe line operating conditions and therefore they cannot make the mistake of interpreting them as leaks.

The present system also immediately locates the section of the pipe line which may be leaking. The mechanism (to be described in greater detail hereinafter) utilized to locate the leak is the same as that employed in detecting the leak. In order to detect the leaks, pressure is varied along the entire pipe line. To locate leaks, the pressure is varied in individual line segments only. This ability to immediately locate a leak, particularly in the case of very long pipe lines, will necessarily result in quick repairs, less ground and air searching, better pipe line service factors, and, more important, better public relations insofar as protection of the environment is concerned.

The present system also provides an immediate and positive test which readily determines whether a leak indication is true or false. As indicated previously, such a feature is extremely desirable. Thus, those people in charge of operating the pipe line are provided with the knowledge and the confidence they need in order to take appropriate action. If a true leak is indicated, then the pipe line can be shut down and the search made. However, if a false leak indication is given, a troubleshooting procedure can be undertaken in order to correct the faults within the system. This aspect of the present invention, that is determining whether a true or false leak exists, is a byproduct of the leak location feature. When a leak is discovered in the overall line system, a separate check is made of each line segment to locate the leak. If the meters or electronic equipment are faulty, they will be faulty on each line segment checked and will indicate a leak for each and every line segment. These multiple leak indications serve as a clear warning that the equipment is at fault. If the equipment is not faulty, it will operate as designed and only indicate a leak in those segments that are leaking.

The system constructed according to the present invention is unique compared to all existing systems in that it changes an operating condition, namely pressure, and observes its effect on the system. This very same factor permits selective application to different segments of the piping system in order to locate the leak and verify that a leak is in fact "real."

Further, the system in unique in that it compares individual or discrete readings to detect a leak rather than comparing the trends of inflow and outflow of the pipe line. It is this feature which permits the system to cancel out the effects of changing pipe line conditions. This is done by taking the discrete reading very close together to minimize the effects of transient pipe line changes and then subtracting them to cancel out these effects altogether. All prior art systems integrate the meter readings over a time period and therefore are vulnerable to mistaking changes in operating condition and changes in pipe line inventory for leaks.

Such features, namely, obtaining discrete sample data at two different pressure conditions, permit the use of statistical procedures such as averaging and tests of significance to reduce the standard error of readings obtained and, thus, increase confidence that a leak is real rather than a normal variation. The end result of these various unique features is that it permits the detection of smaller leaks with a very high level of confidence that the leak is real rather than a fluctuation in operating conditions.

In addition, on very long pipe lines the advantages of the present system are even more apparent and pronounced, since where a system has a large inventory, the effect of pipe line inventory expansion and contraction on the meter readings normally is quite significant. The present invention precludes any effect by the inventory on the meter readings.

A further advantage obtained by the present system over existing systems using flow meters is that absolute accuracy is not required of the meters. The meters merely need give reproduceable readings. Absolute accuracy is not required. This means that the present system does not require expensive and time-consuming calibration to obtain the absolute accuracy that available methods and systems require. Also, meter readings do not need to be corrected to their volume at 60° F., that is, the volume of a quantity of oil when it is at 60° F. The present system compares differences between high and low pressure readings and does not require that these readings be corrected to volumes at 60° F. The actual meter readings can be utilized as is, which eliminates the investment and maintenance costs of devices to measure temperature and viscosity. Also, it eliminates the inaccuracies these devices introduce which blunt the sensitivity of the system to detect leaks. Also, some of these devices have low service factors which will reduce the reliability and service factor of the overall system.

A typical sample calculation showing that the present system could expect to detect a leak as small as 0.1 percent is as follows:

Basis: 2000 B/H Flow Rate
  Meter Repeatability = 0.02 Vol. %
  Standard Deviation = $\sigma$ = 0.007 Vol. %
  $\sigma$ = 0.14 BBLS/Hr.

$F_1$ and $F_2$ designate meters spaced along the pipe line:
  1. Leak at Hi Pressure = $L_{Hi}$ = $Fl_{Hi} - F2_{Hi}$
  2. Leak at Lo Pressure = $L_{Lo}$ = $Fl_{Lo} - F2_{Lo}$
  3. Std. Dev. Leak at Hi Pressure = $\sigma L(Hi)$ $$\sigma L(Hi) = \sqrt{F1(Hi)^2 + F2(Hi)^2}$$

$$\sigma L(Hi) = \sqrt{(.14)^2 + (.14)^2}$$

$$\sigma L(Hi) = .2 \text{ bbl./hr.}$$

(4) Std. Dev. Leak at low pressure = Same = .2 bbl./hr.

(5) Difference between leaks = $\Delta L = L_{Hi} - L_{Lo}$ (6) Std. Dev. of $\Delta L = \sigma \Delta L = \sqrt{\dfrac{\sigma L(Hi)^2}{n} + \dfrac{\sigma L(Lo)^2}{n}}$ where $n$ = number of readings;

Say 16 readings are taken:

(7) $\qquad \sigma \Delta L = \sqrt{\dfrac{.2^2}{16} + \dfrac{.2^2}{16}} = .07$ bbl.

This is the Std. Dev. to be expected between the leak readings at the high pressure and the leak readings at the low pressure. When this difference is greater than 3 Std. Dev.'s or 0.21 BBLS, we can be almost completely confident that there is a leak. Assuming cycling the line pressure by 20 percent (that is, the pressure is raised and lowered over a range that represented 20 percent of the high pressure), this would cause a leak to fluctuate by about 10 percent. The 0.21 BBLS represents this 10% fluctuation, and therefore, the size of the leak would be 2.1 BBLS/Hr. While a 20 percent cycling factor was employed, it should be understood that the pressure can be varied over any range depending on the leak detection accuracy desired. Smaller leaks can be detected as pressure variations are increased. Since the pumping rate was 2,000 B/H, the system can detect a leak of about 0.1 vol. % of flow.

The present system also can detect leaks at all times including periods when temperature changes are changing the volume of material in the line. The prior art leak detection systems are in effect blinded to leaks occurring during these periods. Since the present system does not attempt to set up a material balance, it is not affected by this problem. During periods when temperatures are changing, the inlet and outlet flow meter readings will drift but this drift affects the flow readings at high and low pressures equally. This drift is effectively cancelled out and does not interfere with leak detection. In existing leak detection systems, these blind spots occur for several hours each time the pumping has started or tanks are swung. According to the present system, leak detection is provided one hundred percent of the time and these blind spots would not occur. Finally, the present system can determine the location of the leak by installation of the necessary vales in the pipe line to permit raising and lowering the pressure in successive sections, as will be described in further detail hereinafter.

Figure 1A:
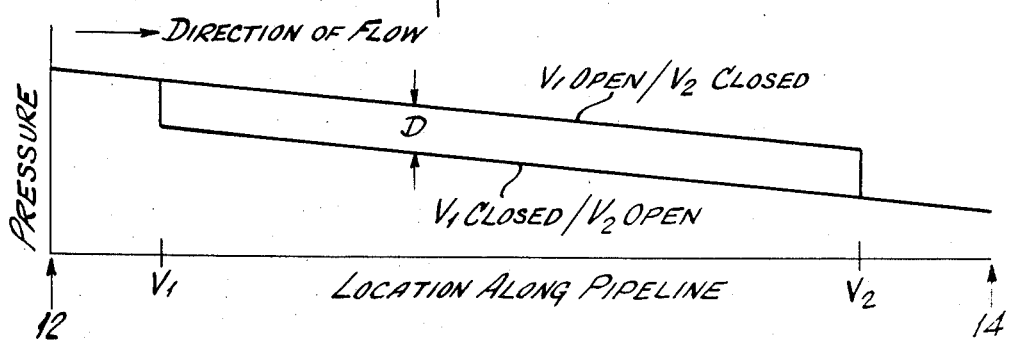
FIG. 1A is a graphical illustration of the pipe line pressure profile of the system of FIG. 1.

Having thus described the basic technique of operation of the present invention, reference now is made to the drawings wherein like reference characters designate like or corresponding parts throughout the several views. There is shown in FIG. 1 a pipe line 10 for carrying a liquid or gas between a centrifugal pump 12 for moving the product through the line to a tank 14. Obviously, this is merely illustrative of a pipe line connected between two points for transferring liquid or gas therebetween. At or near the pump end of the pipe line there is provided means $V_1$ illustrated as comprising a conventional motor-operated gate valve and with a bypass around the valve including an orifice plate while at or near the opposite or tank end of the pipe line there is provided a second means $V_2$ (similar to $V_1$) which also comprises a conventional valve and orifice. The pressure in the overall system can be raised and lowered by opening and closing the valves $V_1$ and $V_2$, whereupon a pressure profile of the system would be as illustrated graphically in FIG. 1A. The opening and closing of $V_1$ and $V_2$ is accomplished by electric signals received from the schematically illustrated control system 16. Instead of the valve and orifice bypass means shown, there may be employed conventional variable opening valves. Connected at either end of the pipe line are standard turbine meters $M_1$ and $M_2$ for measuring flow into and out of the system. As shown in FIG. 1 there is provided electronic control equipment 16 which typically includes control means for monitoring line pressure and valve positions and sending out signals to the equipment which controls the line pressure and automatically takes whatever action may be required if the pressure control is not working. This equipment also includes a signal comparator operably connected between the turbine meters $M_1$ and $M_2$. The comparator monitors the flow in and out of the line, and determines when flow readings should be taken and stores the value of these readings and checks on their validity. This equipment performs the necessary calculations, averaging and comparing of flows to determine if a leak exists and what action should be taken if a leak does occur. Various configurations and types of valves and meters are possible and would depend in part on the type of pump being used and whether the line is unidirectional or bidirectional flow. Basically, any system employed according to the present invention will include meters for measuring flow into and out of the system; means to raise and lower pressure in the pipe line, which may be control valves or valves and orifices in the line or controls on the pumps or compressor moving the material through the line; and transmission and control facilities to read the flows and cycle the pressure. These facilities comprise standard electronic transmission gear and electronic logic circuits and instrumentation. While preferably a digital mini-computer would be employed in the system, it is not absolutely necessary. Finally equipment is needed to make the computations to compare meter readings and determine if a leak exists. This can be logic circuits and registers suitably designed for this purpose or a digital minicomputer. FIG. 1A graphically illustrates pressure vertically against pipe line location along the abscissa. Thus, there is shown graphically the pressure in the pipe line as it is raised and lowered by imposing a variable restriction to the flow at the inlet or outlet or at both inlet and outlet of the pipe line, which depends upon the individual installations and if the flow is in one or both directions. Thus, with the upstream valve, shown at $V_1$, open and the downstream valve, shown at $V_2$, closed, a high pressure exists in the line and the necessary high pressure readings can be obtained in the pipe line between $V_1$ and $V_2$. Likewise, with the valve at $V_1$ closed and valve at $V_2$ open, the line experiences a lower pressure between these valves and the corresponding low pressure readings can be obtained. The distance "D" is the difference between the high and low pressure readings, comprising the amount the pressure is raised and lowered. This difference in pressure causes an existing leak to leak more or less and permits the meter to detect the change and indicate that a leak exists.

Figure 2:
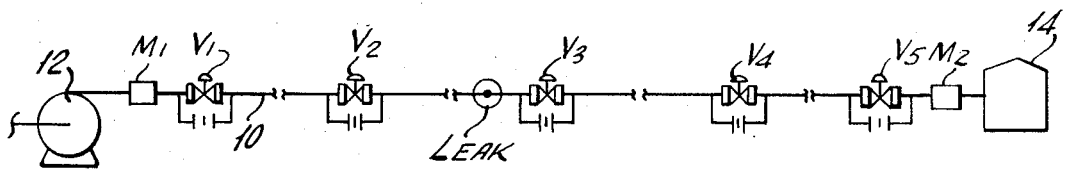
FIG. 2 is a schematic view of a typical system for locating a leak constructed in accordance with the present invention.

FIG. 2 schematically illustrates the procedure by which a leak is located in the pipe line. The valves and orifice bypasses located at several locations along the pipe line permit raising and lowering the pressure in selected segments to determine which segment contains the leak. FIGS. 2A, 2B and 2C portray graphically these particular steps. That is, how the pressure is changed in the line segments to locate the leak. Once a leak is detected, selected segments of the line are subjected to raising and lowering the pressure to find the leaking segment of the line. During normal operation $V_2$, $V_3$, and $V_4$ would remain open while terminal valves $V_1$ and $V_5$ are opened and closed in order to cycle (raise and lower) the pressure in the line. This cycling is shown by FIG. 2A. When a leak is detected by the meters, $V_5$ then is left open and $V_1$ and $V_2$ are used to cycle the pressure between them. The corresponding graphical illustration is shown in FIG. 2B. If the indication of the leak continues, it is then between these valves, $V_1$ and $V_2$. If not, the leak is downstream of $V_2$. In the system shown, no leak indication would occur as the leak is between $V_2$ and $V_3$ and the pressure is not being cycled in that section. The next step is for $V_1$ to be left open and $V_2$ and $V_3$ are used to cycle the pressure between them. In the illustration shown, the leak would then be detected and it would be apparent that the leak was between $V_2$ and $V_3$. This would correspond to the graphic illustration of FIG. 2C.

Figure 3:
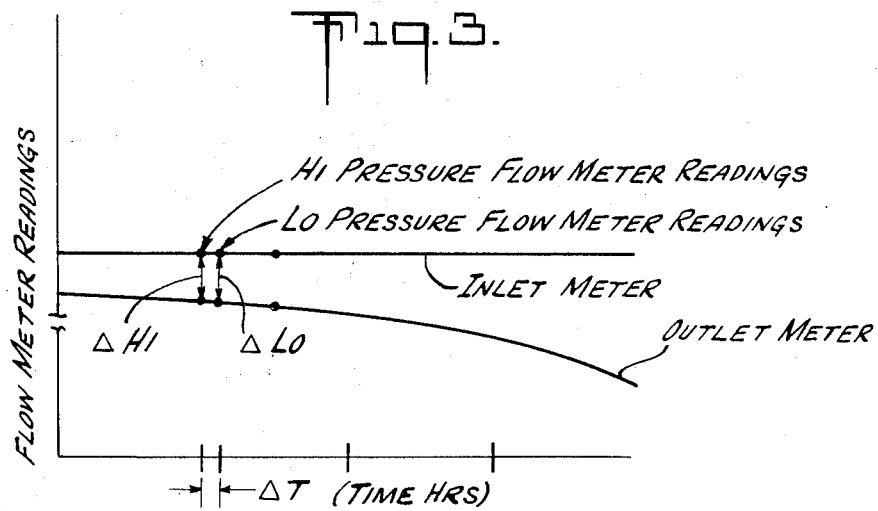
FIGS. 3 and 3A graphically illustrate how a system constructed according to the present invention detects a leak.
Figure 3A:
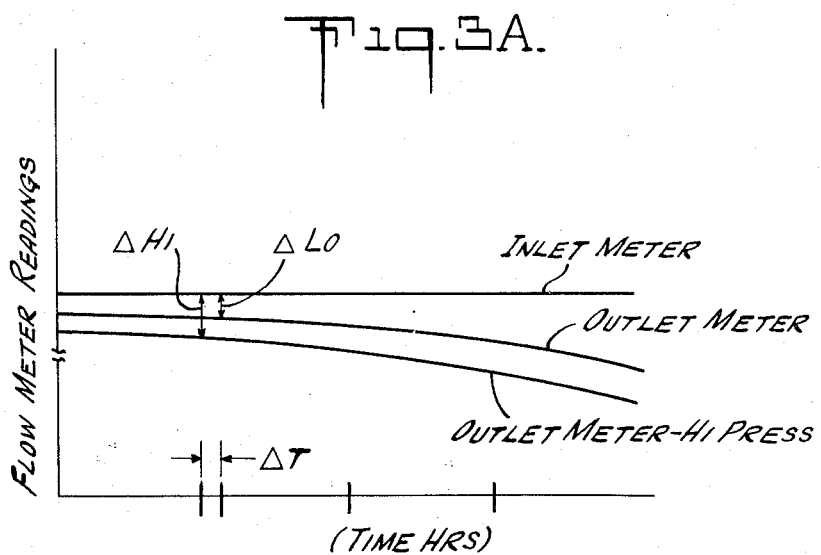

FIGS. 3 and 3A illustrate graphically the method by which a leak is detected. As shown in FIG. 3 under a "no leak condition," assuming constant inlet conditions this condition is indicated by no significant difference existing between the meter readings at high and low pressures (i.e., $\Delta Hi - \Delta Lo = 0$). The outlet meter reading is shown falling off due to the pipe line cooling off. This permits the material in the line to shrink thereby causing a temporary reduction in the outlet meter flow. Conventional leak detection systems would interpret this as a leak. FIG. 3A illustrates a "leak condition." The leak is detected by a significant difference existing between meter readings at high and low pressure (i.e., $\Delta Hi - \Delta Lo = \Delta$ Leak).

It will be appreciated from the foregoing description that a novel and improved leak detection and location system for pipe lines as disclosed herein enjoys significant advantages over conventional systems as discussed in this application. The system is flexible and can monitor for small leaks frequently or infrequently. Leaks can be tested for as often as every few minutes with the minimum interval being set by the speed of the valve operators and the length of the pipe line. The present system also can monitor for large leaks such as line breaks, continuously. Thus, it would compare raw meter readings of inflow and outflow on a continuous basis and provide an immediate alarm if they differed by greater than a predetermined percentage.

It should be understood that the specific technique and details herein illustrated and described are intended to be representative of a preferred embodiment only and that certain changes may be made therein without departing from the clear teachings of the present disclosure. Accordingly, reference should be made to the following appended claims in determining the full scope of the invention.

Having thus set forth the nature of the invention, what is claimed herein is:

1. A method for determining the presence of a leak in a pipe line having a fluid flowing therethrough, comprising the steps of:
    a. establishing a first pressure in said pipe line;
    b. measuring the inflow and outflow of the fluid flowing in said pipe line at said first pressure;
    c. varying said first pressure to a second pressure lower than said first pressure;
    d. measuring the inflow and outflow of the fluid flowing in said pipe line at said second pressure;
    e. comparing the measurements taken at said first and second pressures, whereby a difference between the measurements at said first and second pressures is a measure of the increase in an existing leak in said pipe line.

2. The method according to claim 1 further including the steps of:
    a. obtaining a plurality of measurements at said first and said second pressures; and
    b. averaging said plurality of measurements, whereby only the effects of pressure on an existing leak will be present in the results of the comparison.

3. The method according to claim 1 wherein the first and second pressures are varied along the entire length of said pipe line.

4. The method according to claim 1 wherein said first pressure is established and varied to said second pressure in sequential fashion for different predetermined segments of said pipe line, whereby the particular portion of the pipe line containing the leak readily may be determined.

5. The method according to claim 4 wherein measurements of the inflow and outflow at said first and second pressures are obtained for predetermined portions of said pipe line.

6. A system for determining the presence of a leak in a pipe line having a fluid flowing therethrough comprising, in combination:
    a. meters operably located near the inlet and outlet of said pipe line for measuring the fluid inflow and outflow thereof, respectively;
    b. valve means operably associated with said pipe line for cycling the pressure thereof;
    c. control means operably connected with said valve means to control the opening and closing thereof in predetermined manner, said control means further including means operably connected with said meters for monitoring the fluid inflow and outflow of said pipe line,
whereby upon the cycling of said pressure of said pipe line an existing leak will leak more or less depending upon the direction in which said pressure is cycled and the existence of a leak readily can be determined.

7. The system according to claim 6 wherein said pipe line is divided into predetermined segments having said valve means at the inlet and outlet thereof, said control means being operably connected with each of said valve means for each of said segments such that selected segments of said pipe line can be subjected to cycling of the pressure, whereby the particular segment of said pipe line containing a leak readily can be determined.

* * * * *